United States Patent
Nystuen et al.

(10) Patent No.: US 7,366,862 B2
(45) Date of Patent: Apr. 29, 2008

(54) METHOD AND APPARATUS FOR SELF-ADJUSTING INPUT DELAY IN DDR-BASED MEMORY SYSTEMS

(75) Inventors: John M. Nystuen, Burnsville, MN (US); Steven M. Emerson, Chanhassen, MN (US); Stefan Auracher, Munich (DE)

(73) Assignee: LSI Logic Corporation, Milpitas, CA (US)

( * ) Notice: Subject to any disclaimer, the term of this patent is extended or adjusted under 35 U.S.C. 154(b) by 530 days.

(21) Appl. No.: 10/987,356

(22) Filed: Nov. 12, 2004

(65) Prior Publication Data

US 2006/0107011 A1    May 18, 2006

(51) Int. Cl.
*G06F 12/00* (2006.01)
*G11C 7/22* (2006.01)

(52) U.S. Cl. ............... 711/167; 365/194; 711/105; 713/401

(58) Field of Classification Search .......... None
See application file for complete search history.

(56) References Cited

U.S. PATENT DOCUMENTS

| | | | |
|---|---|---|---|
| 6,584,021 B2* | 6/2003 | Heyne et al. | 365/194 |
| 7,043,611 B2* | 5/2006 | McClannahan et al. | 711/154 |
| 7,106,646 B2* | 9/2006 | Schoenfeld et al. | 365/222 |
| 7,165,185 B2* | 1/2007 | Li et al. | 713/500 |

* cited by examiner

*Primary Examiner*—Gary Portka
(74) *Attorney, Agent, or Firm*—Westman, Champlin & Kelly, P.A.

(57) ABSTRACT

A method and apparatus are provided for interfacing with a synchronous dynamic memory in which memory commands are provided to the memory. The memory is accessed in response to the memory commands. Read data is captured in a data capture circuit having a delay setting. The delay setting is updated in response to detection of a period of read inactivity of the memory.

18 Claims, 4 Drawing Sheets

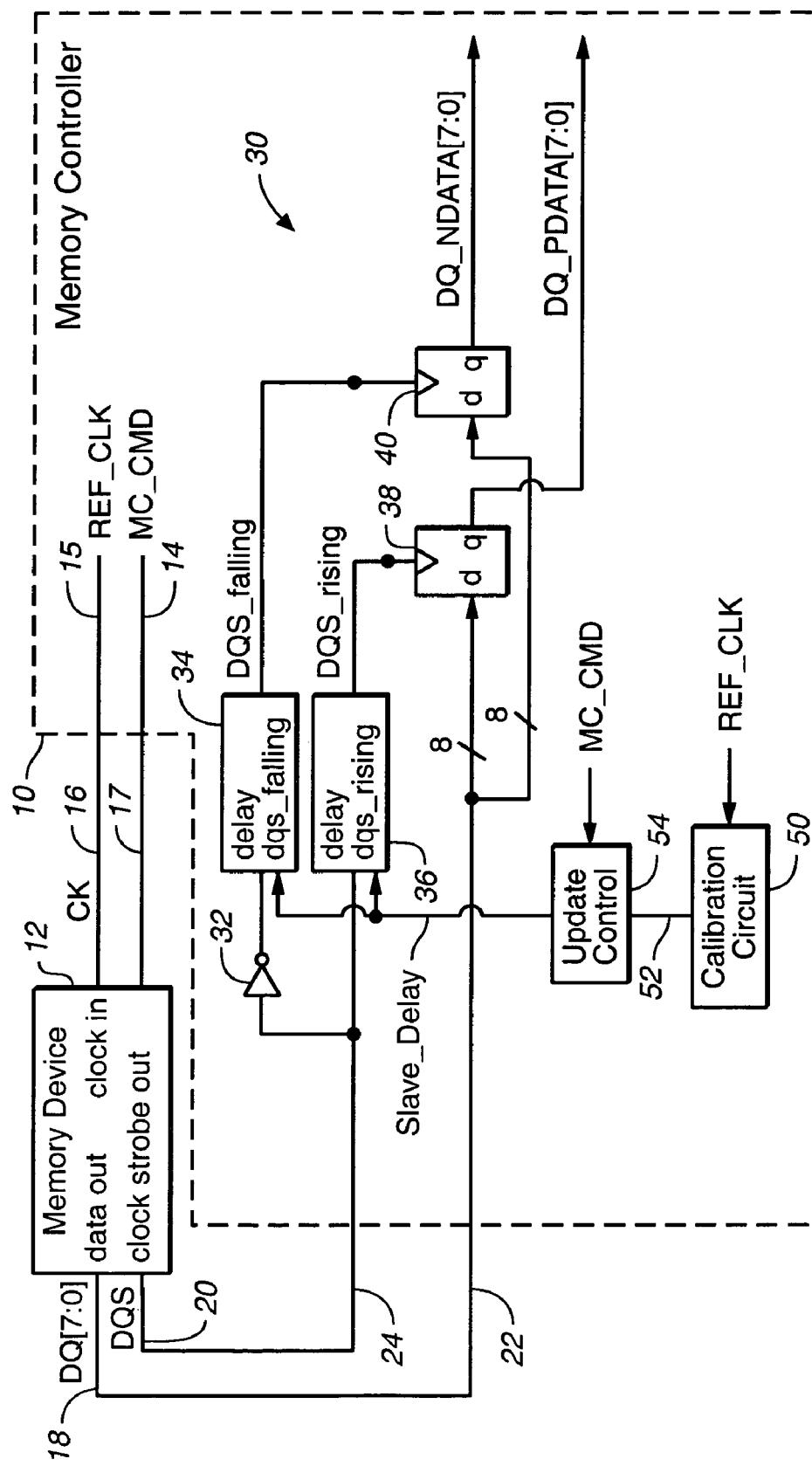
FIG._1

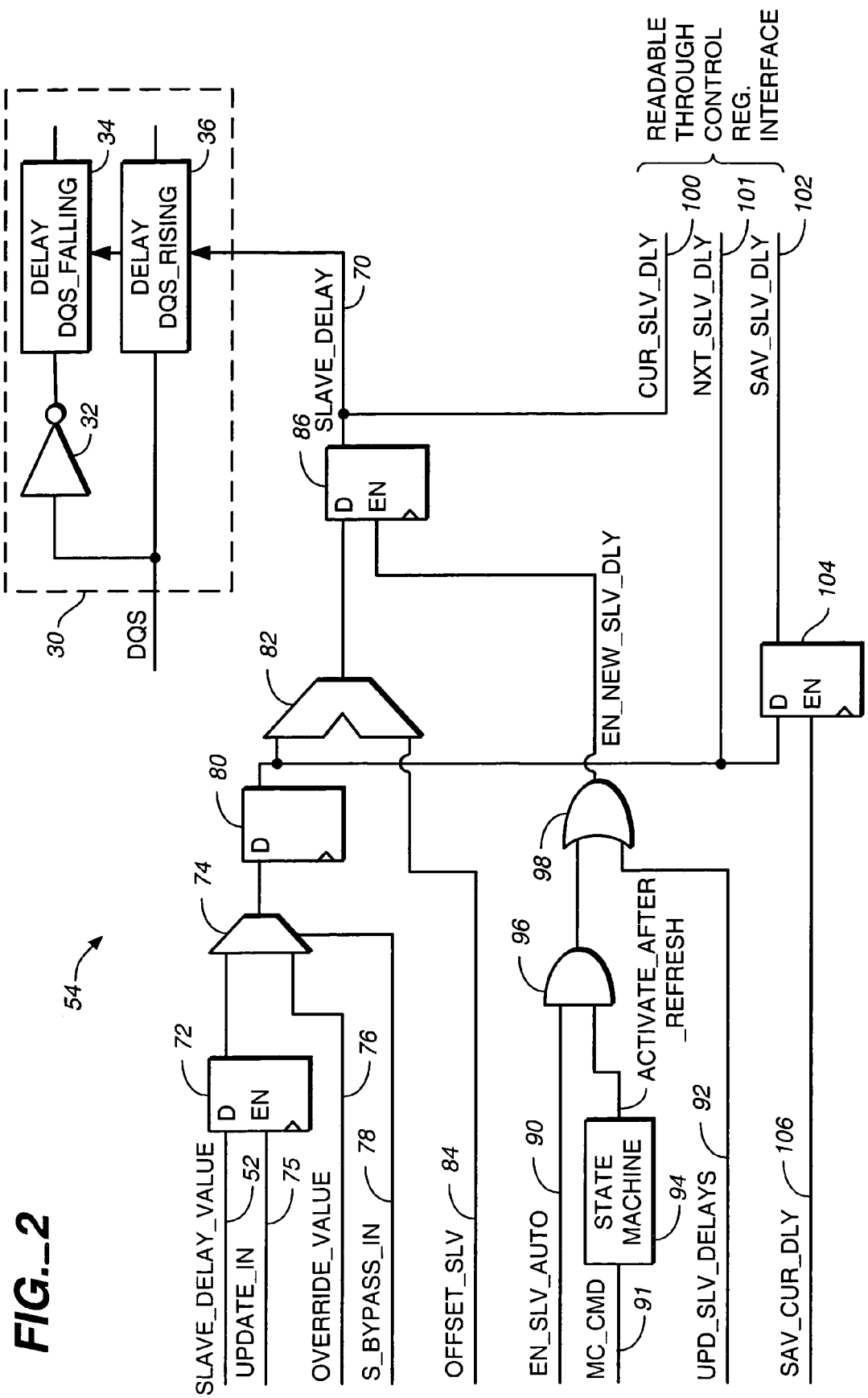
FIG._2

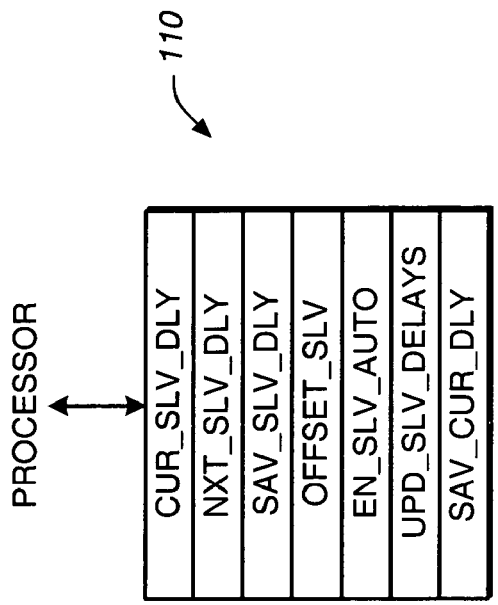
FIG._3
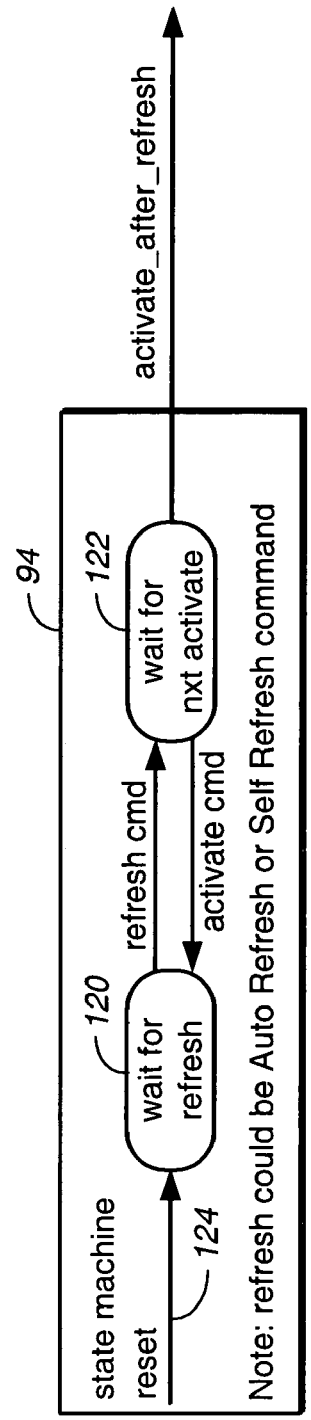
FIG._4

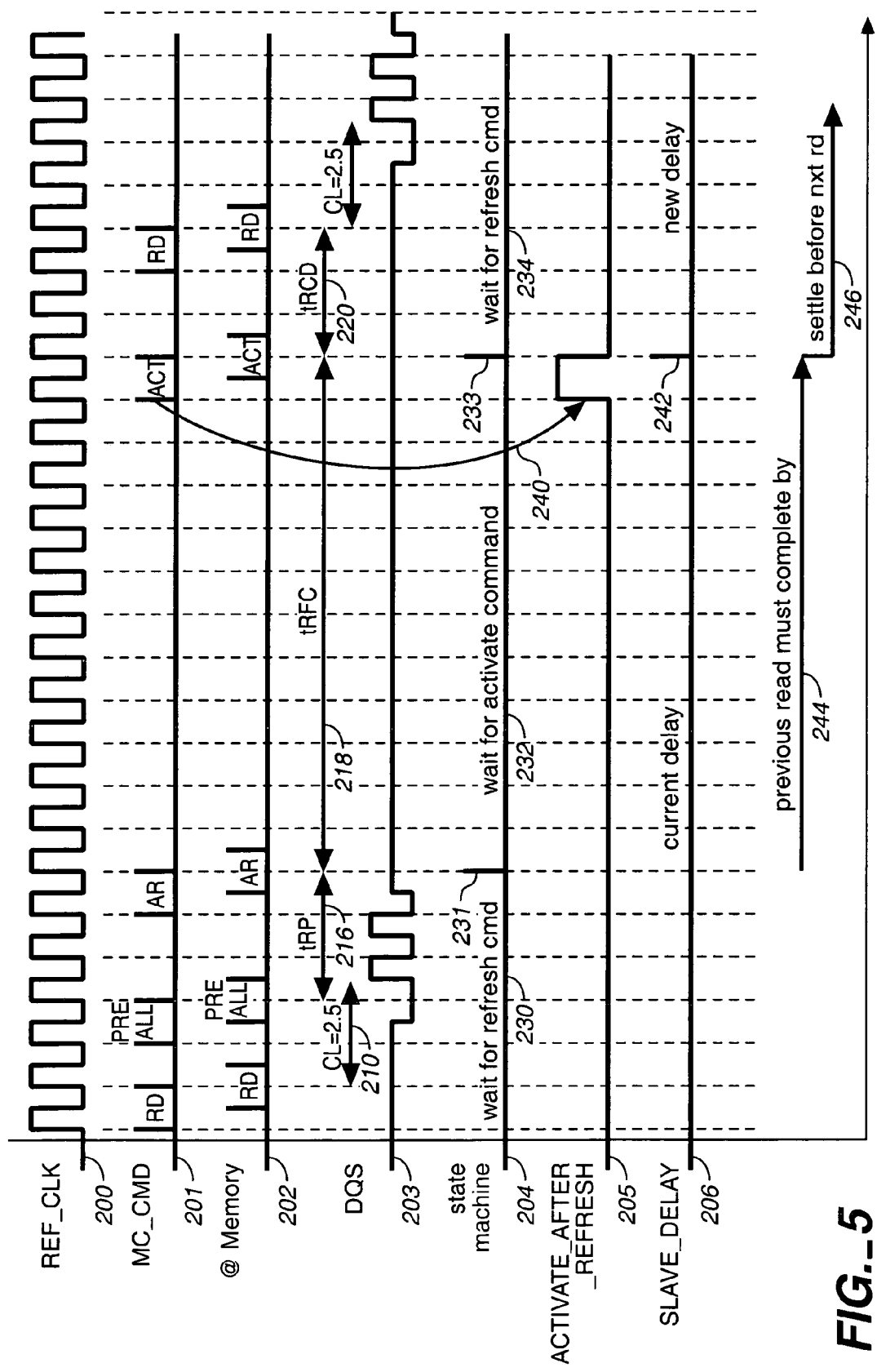
FIG._5

METHOD AND APPARATUS FOR SELF-ADJUSTING INPUT DELAY IN DDR-BASED MEMORY SYSTEMS

FIELD OF THE INVENTION

The present invention relates to semiconductor integrated circuits and more particularly to data capture circuits for synchronous memory systems.

BACKGROUND OF THE INVENTION

Certain types of memory systems use a source synchronous clocking scheme to transmit data between the memory controller and the memory device. The use of a source synchronous clocking scheme basically means that during reads, the memory device sources the clock signal and the data, and during writes, the memory controller sources the clock signal and the data. A source synchronous clocking scheme is contrasted with a clocking scheme that uses a single unidirectional clock to determine the sampling point for both transmit data and receive data. Source synchronous clocking schemes are generally used to eliminate timing uncertainties between the data and the clock strobe signal to which the data is timed. Source synchronous clocking schemes can therefore achieve much higher system clock frequencies.

A double data rate (DDR) synchronous dynamic random access memory (SDRAM) is an example of a memory system that uses a source synchronous clocking scheme. During a read operation, a DDR SDRAM generates a data clock strobe signal having edges that are aligned with changes in the read data. A DDR SDRAM transfers data on each rising and falling edge of a clock strobe signal. A DDR SDRAM therefore transfers two data words per clock cycle. A memory controller is often used to coordinate the transfer of data to and from a DDR SDRAM.

Within the memory controller there resides a physical interface or "PHY layer" that interfaces directly with the external DDR SDRAM devices. One of the main functions of the DDR PHY is to capture read data. The memory controller uses the clock strobe signal for determining when the read data is valid and can therefore be captured. The times at which the read data is captured are preferably synchronized to the clock strobe signal so as to capture the read data in the middle of the valid data window or "data eye".

The data and the clock strobe signal are coincident as they are launched from the DDR SDRAM device. Based on this assumption, the PHY interface of the memory controller delays the clock strobe signal (such as by 90 degrees) through a delay line such that its transitions line up with the middle of the data valid window. The amount of delay provided by the delay line can vary with process, voltage and temperature changes. Therefore, the delay line is preferably programmable such that the settings of the delay line can be adjusted in response to these variances to make the propagation delay through the delay line a proper duration relative to a reference clock.

In the past, this function has been performed by a software routine that is run while the memory device is "off-line". The software routine measures the period of the reference clock through a calibration circuit and sets the appropriate delay as a function of the reference clock period.

A typical calibration circuit uses an analog or digital delay lock loop (DLL) for calibrating the delay setting to the reference clock. Current DLL circuits include a slave delay line having multiple, cascaded delay cells which, when set properly, have a total propagation delay that is equal to the period of the reference clock. A circuit compares the phases of the rising edges of the reference clock with the phase of the output from the DLL and then adjusts the delay setting in the DLL so that the delay is equal to the period of the reference clock. At this point, the delay through each slave delay cell equals a desired fraction of the reference clock period. The delay setting for the slave delay line can then be used to delay the clock strobe signal by an initial, desired fractional amount of the reference clock.

As mentioned above, the memory device is typically taken "off-line" in order to run the calibration routine and update the delay settings to account for delay variances due to changes in voltage or temperature. This prevents the change in the delay settings from interfering with any currently executing memory accesses. However if the delay settings are updated frequently to keep up with ongoing changes in voltage and temperature, such interruptions can significantly reduce the bandwidth of the memory device.

Improved methods and apparatus are therefore desired for updating data capture delay settings in source synchronous memory systems.

SUMMARY OF THE INVENTION

One embodiment of the present invention is directed to a method of interfacing with a synchronous dynamic memory. The method includes: providing memory commands to the memory; accessing the memory in response to the memory commands, including capturing read data in a data capture circuit having a delay setting; and updating the delay setting in response to detection of a period of read inactivity of the memory.

Another embodiment of the present invention is directed to a method of interfacing with a memory. The method includes: accessing the memory through a memory interface, including capturing read data in a data capture circuit having a delay setting; and updating the delay setting periodically in response to a required periodic event on the memory interface.

Another embodiment of the present invention is directed to a synchronous memory system. The system includes a synchronous memory having a read data output and a clock strobe output, which has a predetermined phase alignment with the read data output. A data capture circuit is coupled to the read data output and captures the read data output as a function of a delayed clock strobe signal. A programmable delay generates the delayed clock strobe signal as a function of the clock strobe output and a delay setting. An update control circuit detects a period of inactivity of the read data output and selectively couples an updated delay setting input to the programmable delay during the period of inactivity without interrupting the synchronous memory.

BRIEF DESCRIPTION OF THE DRAWINGS

FIG. 1 is a schematic diagram of a data capture circuit in which one embodiment of the present invention is useful.

FIG. 2 is a block diagram illustrating an update control circuit in greater detail, according to one embodiment of the present invention.

FIG. 3 is a diagram illustrating control registers, which can be assessed by a processor or a state machine, for example.

FIG. 4 is a state machine diagram for the control, which allows delay updates without taking the memory controller offline, according to an embodiment of the present invention.

FIG. 5 is a timing diagram that indicates an example of a window available during a refresh where updates can safely be executed.

DETAILED DESCRIPTION OF ILLUSTRATIVE EMBODIMENTS

FIG. 1 is a schematic diagram illustrating an example of a source synchronous memory system in which one embodiment of the present invention is useful. FIG. 1 illustrates the physical layer interface portion of a memory controller 10, which is coupled to a memory device 12. Memory controller 10 has an internal reference clock REF_CLK, which is used for synchronizing various functions within the memory controller including the capture of data received from memory device 12 and for synchronizing read and write operations within memory device 12 through clock output 15. Memory controller 10 also provides a memory command MC_CMD to memory device 12 on output 14 for controlling the operation to be performed on the memory device. The memory command can include fields such as chip select, write enable, row address select and column address select fields, which are defined to control memory operations such as precharge, activate, read, write and refresh.

In the example shown in FIG. 1, memory device 12 is a double data rate (DDR) synchronous dynamic random access memory (SDRAM) having a clock input 16 labeled "CK", a command input 17, an 8-bit data input/output 18 labeled "DQ[7:0]" and a data clock strobe input/output 20 labeled "DQS". Clock input 16 is coupled to clock output 15 of memory controller 10 for receiving the memory controller's local clock signal REF_CLK.

When performing a read operation in response to a read command from memory controller 10, memory device 12 generates a data clock strobe signal DQS on clock strobe output 20 which has a specified phase relationship to the input clock signal CK. Memory device 12 also provides an 8-bit data word DQ[7:0] on data output 18 having a transition that is aligned with a transition on DQS. In the case of a DDR memory device, the data on data output 18 changes on both the rising and falling edges of DQS.

Data output 18 and clock strobe output 20 are coupled to data input 22 and clock strobe input 24, respectively, of memory controller 10. Inputs 22 and 24 are coupled to a data capture circuit 30 within memory controller 10 for capturing the data words DQ[7:0] provided by memory device 12. Data capture circuit 30 resides in the physical layer "PHY" interface portion of memory controller 10 and includes inverter 32, programmable slave delay lines 34 and 36 and data capture elements 38 and 40. In one embodiment, data capture elements 38 and 40 include D-type flip-flops, which capture data on the rising edges of the clock signals that are applied to the elements. The data capture elements can include any type of memory elements, such as flip-flops, latches, registers, etc.

Programmable slave delay line 36 is coupled between clock input 24 of memory controller 10 and the clock input of data capture element 38. Delay line 36 generates a delayed clock strobe signal DQS_RISING, which has a rising edge that is delayed from the rising edge of DQS by approximately ¼ of the period of the REF_CLK signal. Clock input 24 is also coupled to the clock input of data capture element 40 through inverter 32 and programmable slave delay line 34. Inverter 32 and delay line 34 generate an inverted, delayed clock strobe signal DQS_FALLING, which has a rising edge that is delayed from the falling edge DQS by approximately ¼ of the REF_CLK period. With the ¼ clock period delay, DQS_RISING and DQS_FALLING are preferably aligned to capture the data words at approximately the center of the data valid windows or "data eyes". However, delay lines 34 and 36 can delay DQS_RISING and DQS_FALLING by other fractional delays of the REF_CLK period in alternative embodiments or with other settings. With the above-described configuration, two data words are captured during each cycle of DQS.

In the embodiment shown in FIG. 1, data capture element 38 is an 8-bit latch formed of an array of eight D-type flip-flops. The data inputs of data capture element 38 are coupled to data input 22 for receiving the 8-bit data words DQ[7:0] from memory device 12. On each rising edge DQS_RISING (the delayed rising edged of DQS) data capture element 38 captures the data word on DQ[7:0] that was provided by memory device 12 with the rising edge of DQS. Data capture element produces the captured data as DQ_PDATA[7:0].

Data capture element 40 is an 8-bit latch formed of an array of eight D-type flip-flops. The data inputs to data capture element 40 are coupled to to data input 22 for receiving the 8-bit data words DQ[7:0] from memory device 12. On each rising edge of DQS_FALLING (the delayed falling edge of DQS), data capture element 40 captures the 8-bit data word DQ[7:0] that was provided by memory device 12 with the falling edge of DQS. Data capture element 40 has an 8-bit data output DQ_NDATA[7:0]. The two data outputs DQ_PDATA[7:0] and DQ_NDATA[7:0] reflect the captured data words read from memory device 12 with each cycle of DQS. The data bus from memory device 12 and the data capture elements 38 and 40 can have other widths in alternative embodiments.

As mentioned above, the phase alignment of DQS relative to the DQ[7:0] is preferably adjusted such that the transitions of DQS_RISING and DQS_FALLING line up with the middle of the data valid windows. However, the amount of delay provided by delay lines 34 and 36 can vary with process, voltage and temperature (PVT) conditions. In addition, the voltage and temperature conditions can change dramatically during operation of the circuit. Calibration circuit 50 therefore adjusts the delay settings of delay lines 34 and 36 such that the propagation delays through delay lines 34 and 36 are a proper duration relative to reference clock REF_CLK. Any suitable clock signal can be used as a reference.

Any suitable calibration circuit can be used to alter the delay settings. For example, a delay locked loop can be used to generate a desired delay setting, as measured against the reference clock. Other types of calibration circuits can also be used. Calibration circuit 50 can have calibration cycles that are performed continually, at regular intervals, or at any other suitable time.

The assumption is that the calibration circuit will drift over VT the same way as the delay lines 34 and 36. If calibration circuit 50 then adjusts itself such that it maintains a 90 degree phase shift of the REF_CLK, then the delay codes output by the calibration circuit can be applied to both the rising (36) and falling (34) DQS delay line cicuits and cause these circuits to track. The result is that DQS maintains a substantially constant 90 degree shift.

During operation of memory controller 10, calibration circuit 50 calibrates the propagation delays of delay lines 34 and 36 to the reference clock period by providing updated delay settings to slave control output 52. Update control circuit 54 controls when the updated delay settings are applied to the delay lines 34 and 36. Preferably, the delay settings are updated frequently enough to track present changes in voltage and temperature conditions. However it is desirable for the calibration process not to interfere with the regular operation of the memory device. If the delay settings are loaded into the programmable delay lines during a presently executing memory access, the calibration process can interfere with the memory access. If the memory device is taken out of its normal operation by delaying or otherwise blocking memory accesses in order to perform the updates, memory bandwidth will be sacrificed. For example in prior methods, the memory device 12 is typically taken "off-line" during a calibration process.

In one embodiment of the present invention, update control circuit 54 detects periods of inactivity of memory device 12 and updates the delay settings during these periods. In this manner, memory device 12 does not need to be taken off-line and the updates do not interfere with the normal operation of the memory device. For example, update control circuit 54 can monitor the memory commands on MC_CMD to detect events during which no memory accesses will occur on the data bus DQ[7:0]. The update control circuit 54 can then trigger updates to the delay settings during these events. In one embodiment, the updates are triggered by an event in a refresh sequence, such as the first activate command following a refresh command. The updates can alternatively be performed during other periods of inactivity in alternative embodiments of the present invention.

For dynamic memory, such as a DDR SDRAM, there is a need for the memory controller to refresh the charge on passive storage elements in the memory on a periodic basis. Since no memory accesses occur during certain portions of a refresh sequence, the delay settings can be updated during these portions without interfering with any memory accesses. Also since the charge on the passive storage elements must be refreshed often enough to avoid losing stored data, the frequency of updates to the delay settings is deterministic when triggered by the refresh sequence.

FIG. 2 is a block diagram illustrating update control circuit 54 in greater detail, according to one embodiment of the present invention. Update control circuit 54 receives a calibrated SLAVE_DELAY_VALUE on input 52 from calibration circuit 50 (shown in FIG. 1) and selectively provides an updated SLAVE_DELAY value on output 70, which is loaded into programmable delay lines 34 and 36 as described with reference to FIG. 1. The purpose of update control circuit 54 is to control the times during which the SLAVE_DELAY value on output 70 is updated.

The input SLAVE_DELAY_VALUE is latched in a D-typed flip-flop 72 when enabled by UPDATE_IN, which is received on input 75. Flip-flop 72 is clocked by a local clock signal such as REF_CLK along with the other flip-flops in update control circuit 54. Calibration circuit 50 (shown in FIG. 1) activates UPDATE_IN when the calibration circuit has locked onto the reference clock such that the SLAVE_DELAY_VALUE on input 52 is valid. The output of flip-flop 72 is coupled to a first input of multiplexer 74. A second input of multiplexer is coupled to OVERRIDE_VALUE input 76. The select input of multiplexer 74 is coupled to S_BYPASS_IN input 78.

In one embodiment, the OVERRIDE_VALUE and S_BYPASS_IN inputs are provided by a process controller, which is coupled to memory controller 10, for selectively bypassing the calibrated SLAVE_DELAY_VALUE generated by the calibration circuit 50 (shown in FIG. 1). The process controller sets the state of S_BYPASS_IN to select whether the calibrated SLAVE_DELAY_VALUE or the OVERIDE_VALUE is selected by multiplexer 74 and thus loaded into delay lines 34 and 36. The selected value at the output of multiplexer 74 is latched in flip-flop 80. During normal operation, the process controller controls multiplexer 74 to select the calibrated SLAVE_DELAY_VALUE. However, the OVERRIDE_VALUE can be selected at startup or at any other time it is desired for a different delay value to be loaded into the delay lines.

The delay value latched in flip-flop 80 is applied to a first addend input to adder 82. A second addend input to adder 82 is coupled to OFFSET_SLV input 84 for receiving an offset value that can be added to the delay value in register 80. The offset value on input 84 is received from a programmable control register in memory controller 10. The particular offset value can be loaded into the control register under program control, such as by the process controller. The offset value can provide a fine adjustment to the SLAVE_DELAY_VALUE from calibration circuit 50 that will be loaded into delay lines 34 and 36, such as for data eye training.

The sum output of adder 82 is coupled to flip-flop 86 and is latched when the flip-flop is enabled by EN_NEW_SLV_DLY. The output of flip-flop 86 is coupled to the SLAVE_DELAY output 70, which is coupled to delay lines 34 and 36 in data capture circuit 30 for setting the propagation delays through the delay lines.

As mentioned above, update control circuit 54 updates SLAVE_DELAY output 70 only during certain time periods during which there are no memory accesses presently being executed by the memory device. The time periods or frequency at the SLAVE_DELAY output 70 is updated is controlled by EN_NEW_SLV_DLY. EN_NEW_SLV_DLY is activated as a function of EN_SLV_AUTO input 90, MC_CMD input 91 and UPD_SLV_DELAYS input 92. EN_SLV_AUTO input 90 is an enable input, which enables automatic updates of the SLAVE_DELAY value. The state of EN_SLV_AUTO is stored in a programmable control register within memory controller 10. During normal operation EN_SLV_AUTO is enabled.

MC_CMD input 91 is coupled to MC_CMD output 14 (shown in FIG. 1). State machine 94 monitors the commands issued by the memory controller and generates an ACTIVATE_AFTER_REFRESH signal in response to the first activate command received on input 91 following a refresh command, during a refresh sequence.

The EN_SLV_AUTO and ACTIVATE_AFTER_REFRESH signals are applied to the inputs of logic AND gate 96. As long as EN_SLV_AUTO is enabled (or active), AND gate 96 passes the ACTIVATE_AFTER_REFRESH signal to logic OR gate 98. Logic OR gate 98 activates EN_SLV_DLY when the output of AND gate 96 goes active (due to ACTIVATE_AFTER_REFRESH) or when UPDATE_SLV_DELAYS is active. Again, UPD_SLV_DELAYS has a state that is stored in a programmable control register in memory controller 10, which provides a manual path to enable and update of the delay settings under program control. This manual path bypasses the conditions enforced by state machine 94 but should be done while memory controller is offline.

Another feature provided by update control circuit 54 is the ability to monitor the performance of the update process and the delay setting history through outputs 100-102. Slave delay output 70 is coupled to CUR_SLV_DLY output 100. The delay setting stored in flip-flop 80 is coupled to NXT_SLV_DLY output 101. The delay setting stored in flip-flop 80 is also coupled to flip-flop 104. Flip-flop 104 is enabled by SAV_CUR_DLY input 106, which has a state that is stored in a control register within memory controller 10. The output of flip-flop 104 is coupled to SAV_SLV_DLY output 102. When active, SAV_CUR_DLY enables flip-flop 104 to latch the next delay setting at the output of flip-flop 80 and store the next delay setting in the control register for future reference. For example, the starting delay setting on SAVE_SLV_DLY can be stored after initialization of the system and used as a reference by which to compare the current slave delay setting and the next slave delay setting on outputs 100 and 101.

Outputs 100-102 are readable by the processor through the control register interface of memory controller 10. Through these outputs, the processor can monitor the current slave delay setting, the next slave delay setting, and the saved previous delay setting. The processor can therefore monitor performance factors such as the history of the delay settings and percentage change over time, and can perform any manual adjustments as desired.

FIG. 3 is a diagram illustrating the relevant control registers 110 of the memory controller, which can be assessed by a processor or a higher level state machine, for example. Control registers 110 include entries for each of the outputs 100-102 shown in FIG. 2 including the current slave delay CUR_SLV_DLY, the next slave delay NXT_SLV_DLY and the saved slave delay SAV_SLV_DLY. These entries are read only entries. Control registers 110 also include entries for the offset value OFFSET_SLV, the enable auto update signal EN_SLV_AUTO, the manual update signal UPD_SLV_DELAYS and the save current delay signal SAV_CUR_DLY. These entries are programmable by the processor or a higher level state machine.

FIG. 4 is a state machine diagram illustrating state machine 94 shown in FIG. 2. State machine 94 has two states, a "wait for refresh" state 120 and a "wait for next activate" state 122. State machine 94 enters the "wait for refresh" state 120 upon a system reset, as shown by arrow 124. In state 120, state machine 94 monitors the MC_CMD commands (shown in FIG. 2) for a refresh command. When a refresh command is detected, state machine 94 transitions from state 120 to state 122 and waits for the next activate command. At the next activate command, state machine 94 temporarily enables ACTIVATE_AFTER_REFRESH, returns to state 120 and waits for the next refresh command.

As described with reference to FIG. 2, update control circuit 54 updates the delay settings each time the ACTIVATE_AFTER_REFRESH signal is set to an active state, such as a logic high state, assuming the EN_SLV_AUTO input 90 is enabled. The refresh command can represent an autorefresh command or a self-refresh command, for example.

As mentioned above, it is desirable for the delay setting values to be updated without interfering with any memory accesses. Since the refresh sequence is performed at regular, frequent intervals the refresh sequence can be used to trigger an update during inactivity of the memory bus. However upon initiation of a refresh command, the update control circuit must allow enough time for any previous read commands to complete. Doing an update at the time of the refresh command may not allow enough time for the propagation delays of DQ and DQS. By waiting for the first activate command after a refresh command, any read commands prior to the refresh command will have completed by the time the update occurs.

In addition, the update control circuit should allow enough time for the slave delay lines to settle with the new delay settings before the next read begins. It has been found that for most memory parts, there is sufficient time from the first activate command following a refresh command and before the next read begins for the delay lines to be updated and settled to their new values.

In an alternative embodiment, the ACTIVATE_AFTER_REFRESH signal is temporarily activated after a predefined or programmed delay following a refresh command. This delay would be set to allow sufficient time for any previous read commands to complete.

FIG. 5 is a timing diagram illustrating various signals in the memory system shown in FIG. 1 and the update control circuit shown in FIG. 2 for a particular memory device, according to one embodiment of the present invention. Waveform 200 represents the reference clock REF_CLK. Waveform 201 represents various commands issued by the memory controller over the memory command bus MC_MCD. In the example shown in FIG. 5 these memory commands include a read command "RD", a precharge command "PRE ALL", a refresh command "AR", an activate command "ACT", followed by a further read command "RD". Waveform 202 represents receipt of the memory commands at the memory, including any associated delay.

Waveform 203 represent the data clock strobe signal DQS received from the memory device. The timing shown in waveform 203 is ideal for simplicity. Arrow 210 represents a column address select delay of 2.5 clock cycles following the read command RD. For the example shown in FIG. 5, the first byte of read data is available 2.5 clock cycles following the read command. Arrow 212 represents the transition at which the first byte of data is available, and arrow 214 represents the transition at which the second byte of data is available. Arrow 216 represents a time delay tRP that the memory controller must wait for a precharge command before issuing a refresh command. The value of tRP is provided in the specification of the memory device. Arrow 218 represents a time delay tRFC that the memory controller must wait from the refresh command before issuing an activate command. Arrow 220 represents the memory specification of the time delay tRCD that the memory controller must wait from an activate command before issuing a subsequent read command. These time delays are provided as examples only and can vary from one memory device to the next.

Waveform 204 represents the state of state machine 92 shown in FIG. 4. In time window 230, the state machine is in the first state and waits for a refresh command. At 231, the state machine detects the refresh command on MC_CMD and transitions to the second state at 232. In the second state, the state machine waits for the activate command. At 233, the state machine detects the next activate command on MC_CMD and transitions back to the first, "wait for refresh command" state at 234.

Waveform 205 represents the ACTIVATE_AFTER_REFRESH signal generated by the state machine. This signal is normally in an inactive, logic low state. When the state machine detects the first activate command following a refresh command, the state machine triggers the ACTIVATE_AFTER_REFRESH signal to go active, as shown by arrow 240. In this example, the signal is activated for one clock cycle and then reset as the state machine transitions back to the "wait for refresh command" state. Waveform 206 represents the updated SLAVE_DELAY value that is loaded into the programmable delay lines. The SLAVE_DELAY value maintains a current delay setting until waveform 205 goes active. When waveform 205 goes active, a new delay value is loaded into the delay lines, at 242.

As mentioned above, a new delay setting cannot be loaded into the delay lines until the previous read has completed. Arrow 244 represents time period during which the previous read command must complete. Time period 244 is sufficiently long such that the DQS signal can propagate through the delay lines (at the current setting) to capture the read data before the new delay setting is loaded into the delay lines. Arrow 246 represents the time during which the new delay setting can settle into the delay lines before the next read command. It has been found that the time period from the activate command to the next read command allows plenty of time for the new delay setting to settle.

As mentioned above, the update control circuit can be adapted in an alternative embodiment to update the delay settings after a predetermined time period following the refresh command. This time period would be calculated to allow sufficient time during the beginning of window 244 for the previous read command to complete before activating the update.

With the above-embodiments, the update control circuit detects a window of time during which it is guaranteed that no memory accesses are occurring on the memory interface. It is desirable that the updates can be performed without interfering with normal operation with the memory device. In these embodiments, the updates are inserted between memory accesses by detecting events in the memory commands issued to the memory device. Updating the delay values in response to the first activate command following a refresh command does not interfere with the memory interface if all memory ranks are refreshed at the same time or if one rank is updated while no read accesses are occurring for the other ranks. Insertion of the updates during periods of inactivity allows frequent updates to occur without any adverse affect on the bandwidth of the memory.

Although the present invention has been described with reference to preferred embodiments, workers skilled in the art will recognize that changes may be made in form and detail without departing from the spirit and scope of the invention. For example although an embodiment of the update control circuit is shown in the context of a DDR SDRAM memory, the circuit can be used with other types of memory devices.

What is claimed is:

1. A method of interfacing with a synchronous dynamic memory, the method comprising:
    providing memory commands from a memory controller to the memory over a memory bus;
    receiving at the memory controller read data and a clock strobe signal, transmitted over the memory bus by the memory in response to the memory commands, wherein the clock strobe signal has a predetermined phase alignment with the read data;
    generating a delayed clock strobe signal relative to a data valid window of the read data as a function of the clock strobe signal that was received over the memory bus and a delay setting;
    capturing the read data in a data capture circuit of the memory controller as a function of the delayed clock strobe signal; and
    updating the delay setting in response to detection of a period of read inactivity of the memory.

2. The method of claim 1 wherein:
    the step of updating comprises updating the delay setting in response to a detected event in the memory commands;
    the memory commands comprise a refresh sequence; and
    the detected event on which the step of updating is triggered is an event within the refresh sequence.

3. The method of claim 2 wherein:
    the refresh sequence comprises a refresh command, which is followed by a next subsequent activate command; and
    the step of updating is triggered by the next subsequent activate command, following the refresh command.

4. The method of claim 2 wherein:
    the refresh sequence comprises a refresh command; and
    the step of updating is triggered after a predetermined time delay following the refresh command.

5. The method of claim 2 wherein:
    the memory commands comprise a plurality of refresh sequences that occur at regular time intervals and each refresh sequence comprises a refresh command, which is followed by a next subsequent activate command; and
    the step of updating is triggered by the next subsequent activate command, following each refresh command.

6. The method of claim 1 wherein:
    the step of updating comprises updating the delay setting in response to a detected event in the memory commands;
    the memory commands comprise required periodic events; and
    the step of updating is triggered by the required periodic events.

7. The method of claim 1 wherein the step of updating the delay setting is performed in a manner that guarantees that the delay setting is updated during a window of time in which there are no read accesses to the memory.

8. A method of interfacing with a memory, the method comprising:
    providing memory commands to the memory from a memory controller over a memory bus;
    receiving at the memory controller read data and a clock strobe signal, transmitted over the memory bus by the memory in resonse to the memory commands, wherein the clock strobe signal has a predetermined phase alignment with the read data;
    generating a delayed clock strobe signal relative to a data valid window of the read data as a function of the clock strobe signal that was received over the memory bus and a delay setting;
    capturing the read data in a data capture circuit of the memory controller as a function of the delayed clock strobe signal; and
    updating the delay setting periodically in response to a required periodic event on the memory bus.

9. The method of claim 8 wherein the required periodic event comprises a memory refresh sequence.

10. The method of claim 9 wherein:
    the refresh sequence comprises a refresh command, which is followed by a next subsequent activate command; and
    the step of updating is triggered by the next subsequent activate command, following the refresh command.

11. The method of claim 10 wherein:
    the refresh sequence comprises a refresh command; and
    the step of updating is triggered after a predetermined time delay following the refresh command.

12. The method of claim 8 wherein the step of updating the delay setting periodically in response to a required periodic event on the memory interface is performed in a manner that guarantees that the delay setting is updated during a window of time that there are no read accesses to the memory.

13. A synchronous memory system comprising:

a synchronous memory comprising a read data output and a clock strobe output, which has a predetermined phase alignment with the read data output; and a memory controller comprising:

a data capture circuit, which is coupled to the read data output and the clock strobe output over a memory bus and captures the read data output as a function of a delayed clock strobe signal;

a programmable delay, which generates the delayed clock strobe signal as a function of the clock strobe output and a delay setting;

an updated delay setting input; and an update control circuit, which detects a period of inactivity of the read data output and selectively couples the updated delay setting input to the programmable delay during the period of inactivity without interrupting the synchronous memory.

14. The synchronous memory system of claim 13 wherein:

the memory controller provides memory commands to the synchronous memory over the memory bus; and the update control circuit of the memory controller is also coupled to receive the memory commands and detects an event within the memory commands, which is representative of the period of inactivity.

15. The synchronous memory system of claim 13 wherein:

the memory commands comprise a memory refresh sequence; and the update control circuit is configured to selectively couple the updated delay setting input to the programmable delay when the control circuit detects an event within the refresh sequence.

16. The method of claim 15 wherein:

the refresh sequence comprises a refresh command, which is followed by a next subsequent activate command; and the event detected by the update control circuit comprises the next subsequent activate command, following the refresh command.

17. The memory system of claim 16 wherein:

the update control circuit comprises a state machine having a first, wait for the refresh command state and a second, wait for the next subsequent activate command state;

the update control circuit transitions from the first state to the second state upon detecting the refresh command; and the update control circuit transitions from the second state to the first state and couples the updated delay setting input to the programmable delay upon detecting the next subsequent activate command.

18. The method of claim 15 wherein:

the refresh sequence comprises a refresh command; and the event detected by the update control circuit comprises expiration of a predetermined time delay following the refresh command.

\* \* \* \* \*